United States Patent
Galansky et al.

(10) Patent No.: US 10,442,272 B2
(45) Date of Patent: Oct. 15, 2019

(54) METHOD AND SYSTEM FOR DEFROSTING A HEAT EXCHANGER

(71) Applicant: THERMO KING CORPORATION, Minneapolis, MN (US)

(72) Inventors: Martin Galansky, Rakovnik (CZ); Michal Kolda, Prague (CZ); Michal Hegar, Prague (CZ); Pavel Houdek, Kutna Hora (CZ); Petra Stavova, Prague (CZ)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 15/505,706

(22) PCT Filed: Aug. 21, 2015

(86) PCT No.: PCT/US2015/046255
§ 371 (c)(1),
(2) Date: Feb. 22, 2017

(87) PCT Pub. No.: WO2016/029092
PCT Pub. Date: Feb. 25, 2016

(65) Prior Publication Data
US 2017/0274732 A1    Sep. 28, 2017

Related U.S. Application Data

(60) Provisional application No. 62/040,987, filed on Aug. 22, 2014.

(51) Int. Cl.
*B60H 1/00* (2006.01)
*F25B 49/02* (2006.01)
(Continued)

(52) U.S. Cl.
CPC ....... *B60H 1/00907* (2013.01); *F25B 41/003* (2013.01); *F25B 47/022* (2013.01);
(Continued)

(58) Field of Classification Search
CPC .. B60H 1/00907; B60H 1/321; B60H 1/3232; F25B 41/003; F25B 47/022; F25B 49/02;
(Continued)

(56) References Cited

U.S. PATENT DOCUMENTS 4,373,349 A * 2/1983 Mueller ................ F25D 21/006
62/155
5,813,242 A * 9/1998 Lawrence ............. F25B 41/062
62/156

(Continued)

FOREIGN PATENT DOCUMENTS

CN       202071840 U     12/2011
EP       2236383 A2      10/2010
(Continued)

OTHER PUBLICATIONS

International Search Report and Written Opinion, International Patent Application No. PCT/US2015/046255, dated Nov. 27, 2015 (11 pages).

(Continued)

*Primary Examiner* — Jianying C Atkisson
*Assistant Examiner* — Paul S Schwarzenberg
(74) *Attorney, Agent, or Firm* — Hamre, Schumann, Mueller & Larson, P.C.

(57) ABSTRACT

A method for defrosting a heat exchanger of a refrigeration circuit is provided. The method includes monitoring a compressor suction parameter at a suction line to a compressor of the refrigeration circuit. The method also includes determining a compressor suction parameter threshold. Also, the method includes initiating a defrost mode of the refrigera- (Continued)

tion circuit when the compressor suction parameter is less than or equal to the compressor suction parameter threshold.

16 Claims, 6 Drawing Sheets

(51) Int. Cl.
*F25B 41/00* (2006.01)
*F25B 47/02* (2006.01)

(52) U.S. Cl.
CPC .... *F25B 49/02* (2013.01); *B60H 2001/00961* (2019.05); *F25B 2313/0314* (2013.01); *F25B 2700/1933* (2013.01); *F25B 2700/2106* (2013.01); *F25B 2700/21151* (2013.01)

(58) Field of Classification Search
CPC ...... F25B 2313/0314; F25B 2700/1933; F25B 2700/2106; F25B 2700/21151; F25B 5/02; F25B 47/02
USPC ...................................... 62/80, 115
See application file for complete search history.

(56) References Cited

U.S. PATENT DOCUMENTS

| | | |
|---|---|---|
| 5,845,502 A | 12/1998 | Chen et al. |
| 2005/0066671 A1 | 3/2005 | Srichai et al. |
| 2006/0042282 A1 | 3/2006 | Ludwig et al. |
| 2007/0137238 A1* | 6/2007 | Hu .................. F25B 5/02 62/277 |
| 2008/0196418 A1 | 8/2008 | Lifson et al. |
| 2010/0107661 A1 | 5/2010 | Awwad et al. |
| 2010/0191402 A1* | 7/2010 | Aldrich, III .......... B60W 10/30 701/33.9 |
| 2012/0011866 A1* | 1/2012 | Scarcella ................ F25B 1/10 62/79 |
| 2012/0137710 A1* | 6/2012 | Reimann ................ F24F 13/10 62/89 |
| 2012/0241027 A1* | 9/2012 | Mesner ................ F16K 31/406 137/512 |
| 2012/0318006 A1 | 12/2012 | Liu et al. |
| 2013/0019617 A1 | 1/2013 | Hegar et al. |
| 2013/0192280 A1* | 8/2013 | Kim ....................... F25D 21/06 62/80 |
| 2013/0291577 A1* | 11/2013 | Miyakoshi ......... B60H 1/00392 62/151 |
| 2014/0026600 A1* | 1/2014 | Wippler ............. B60H 1/00785 62/80 |

FOREIGN PATENT DOCUMENTS

| | | |
|---|---|---|
| KR | 20130101252 A | 9/2013 |
| WO | 2012003202 | 1/2012 |

OTHER PUBLICATIONS

European Search Report issued in corresponding European Application No. 15834601.5 dated Jun. 30, 2017 (8 pages).

* cited by examiner

METHOD AND SYSTEM FOR DEFROSTING A HEAT EXCHANGER

FIELD

Embodiments of this disclosure relate generally to a heat pump configuration of a refrigeration circuit and more particularly to a method and system for defrosting a heat exchanger of a refrigeration circuit when operating in a heat pump configuration.

BACKGROUND

In a typical vapor compression refrigeration circuit, various components, including a compressor, two heat exchangers, and an expansion device, are arranged and operated to transfer heat from one location to another. With a heat pump configuration, refrigerant flow through the refrigeration circuit can be reversed from the refrigerant flow when the refrigeration circuit is operating in a cooling configuration so that the refrigeration circuit may transfer heat not only from a first location to a second, but also from the second location to the first. For example, a first heat exchanger may be located within a conditioned space and a second heat exchanger may be located outside the conditioned space. In a cooling configuration, heat is transferred from the first heat exchanger to the second, cooling; the conditioned space. In a heat pump configuration, heat is transferred from the second heat exchanger to the first, heating the conditioned space.

SUMMARY

Embodiments of this disclosure relate generally to a heat pump configuration of a refrigeration circuit. More specifically, the embodiments relate to a method and system for defrosting a heat exchanger of a refrigeration circuit when operating in a heat pump configuration.

In one embodiment, a method for defrosting a heat exchanger of a refrigeration circuit is provided. The method includes monitoring a compressor suction parameter at a suction line to a compressor of the refrigeration circuit. The method also includes determining a compressor suction parameter threshold. Also, the method includes initiating a defrost mode of the refrigeration circuit when the compressor suction parameter is less than or equal to the compressor suction parameter threshold.

In another embodiment, a refrigeration system for providing heating to a conditioned space is provided. The system includes a refrigeration circuit, a compressor suction parameter sensor and a controller. The refrigeration circuit includes a compressor and an outside heat exchanger. The compressor suction parameter sensor is configured to monitor a compressor suction parameter at a suction line to the compressor. The controller is configured to receive compressor suction parameter data from the compressor suction parameter sensor, and is configured to initiate a defrost mode when the compressor suction parameter is less than or equal to the compressor suction parameter threshold.

In yet another embodiment, a refrigerated transport unit is provided. The refrigerated transport unit includes a container and a transport refrigeration unit. The container includes a conditioned space. The transport refrigeration unit is coupled to an end of the container and is configured to heat the conditioned space. The transport refrigeration unit includes a refrigeration circuit, a compressor suction parameter sensor and a controller. The refrigeration circuit includes a compressor and an outside heat exchanger. The compressor suction parameter sensor is configured to monitor a compressor suction parameter at a suction line to the compressor. The controller is configured to receive compressor suction parameter data from the compressor suction parameter sensor, and is configured to initiate a defrost mode when the compressor suction parameter is less than or equal to the compressor suction parameter threshold.

BRIEF DESCRIPTION OF THE DRAWINGS

References are made to the accompanying drawings that form a part of this disclosure, and which illustrate the embodiments in which the systems and methods described in this Specification can be practiced.

Like reference numbers represent like parts throughout.

DETAILED DESCRIPTION

Embodiments of this disclosure relate generally to a heat pump configuration of a refrigeration circuit. More specifically, the embodiments relate to a method and system for defrosting a heat exchanger of a refrigeration circuit when operating in a heat pump configuration.

The embodiments described herein can provide proper initiation and termination of a defrost mode to prevent mal-defrost phenomena. That is, early initiation of the defrost mode can significantly reduce heating capacity of the refrigeration circuit, thereby reducing energy efficiency of the refrigeration circuit. Late initiation of the defrost mode can cause a heat exchanger acting as an evaporator of the refrigeration circuit to freeze (e.g., clogging an evaporator coil with frost) which can significantly reduce the heating capacity of the refrigeration circuit. Also, late termination of the defrost mode can needlessly extend the amount of time and energy in the defrost mode and thereby reduce energy efficiency of the refrigeration circuit.

In particular, the embodiments described herein provide a method and system for initiating and terminating a defrost mode based on a compressor suction parameter (e.g., a compressor suction pressure or a compressor suction temperature) and an ambient air temperature (e.g., the temperature of air outside the conditioned space). Accordingly, a defrost mode can be initiated only when it is necessary (e.g., before a heat exchanger is clogged due to frost and heating capacity of the refrigeration circuit drops). Also, mal-defrost phenomena can be prevented. Moreover, the heating capacity of the refrigeration circuit and the coefficient of performance of the heat pump configuration can be kept at a maximum possible value at all ambient weather conditions. Further, the time period in a defrost mode can be shortened. Moreover, initiation and termination of the defrost mode can be set independent of an ambient air humidity condition. The embodiments described herein can determine when to initiate and terminate the defrost mode with high reliability as the compressor suction parameter is not influenced by ambient conditions outside of the conditioned space.

Also, the embodiments described herein can determine when to initiate and terminate the defrost mode for a refrigeration circuit regardless of the components used to make up the refrigeration circuit. For example, the embodiments described herein can be used for a refrigeration circuit that uses a variable speed compressor, as initiation and determination of the defrost mode is determined independently of a refrigerant mass flow.

The embodiments described herein can allow the defrost mode to occur more frequently and for a shorter period of time.

The embodiments described herein can be used in a transport refrigeration system (TRS) for a transport unit (e.g., rail container, a container on a flat car, an intermodal container, etc.), a truck, a box car, or other similar transport unit (generally referred to as a "refrigerated transport unit"). The embodiments described herein can also be used for a commercial refrigeration system (e.g., a commercial heating, ventilation air-conditioning (HVAC) system) for commercial building applications, a residential refrigeration system (e.g., a residential HVAC system) for residential housing applications, etc. Also, the embodiments described herein can be used for transport (e.g., bus and rail, etc.) HVAC systems.

Figure 1A:
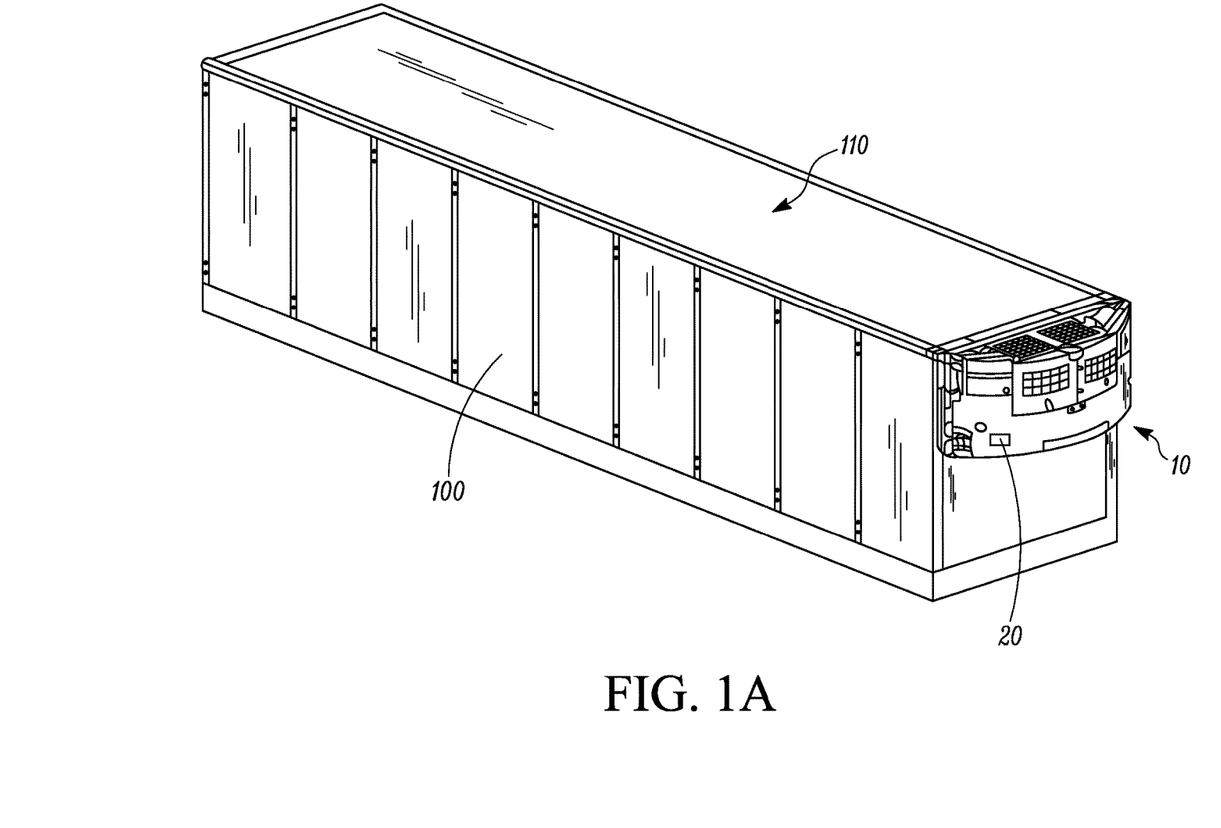
FIG. 1A illustrates a perspective view of a refrigerated container including a refrigeration circuit, according to one embodiment.

FIG. 1A is a perspective view of a refrigerated container 100 that can be used for transporting cargo of various types. Coupled to one end of the refrigerated container 100 is a transport refrigeration unit (TRU) 10 that includes, among other features, a refrigeration circuit (not shown) which is used to control the climate, including e.g., the temperature and the humidity level, of a conditioned space 110 within the refrigerated container 100. The TRU 10 also includes a controller 20 that is configured to communicate with, manage, command, direct and regulate the behavior of one or more refrigeration components of the refrigeration circuit (e.g., one or more valves, an evaporator, a condenser, a compressor, an expansion valve (EXV) etc.), a generator, etc.

The refrigerated container 100 could alternatively be a trailer, a railroad car, a straight truck cargo space, or other storage compartment used to transport cargo.

Figure 1B:
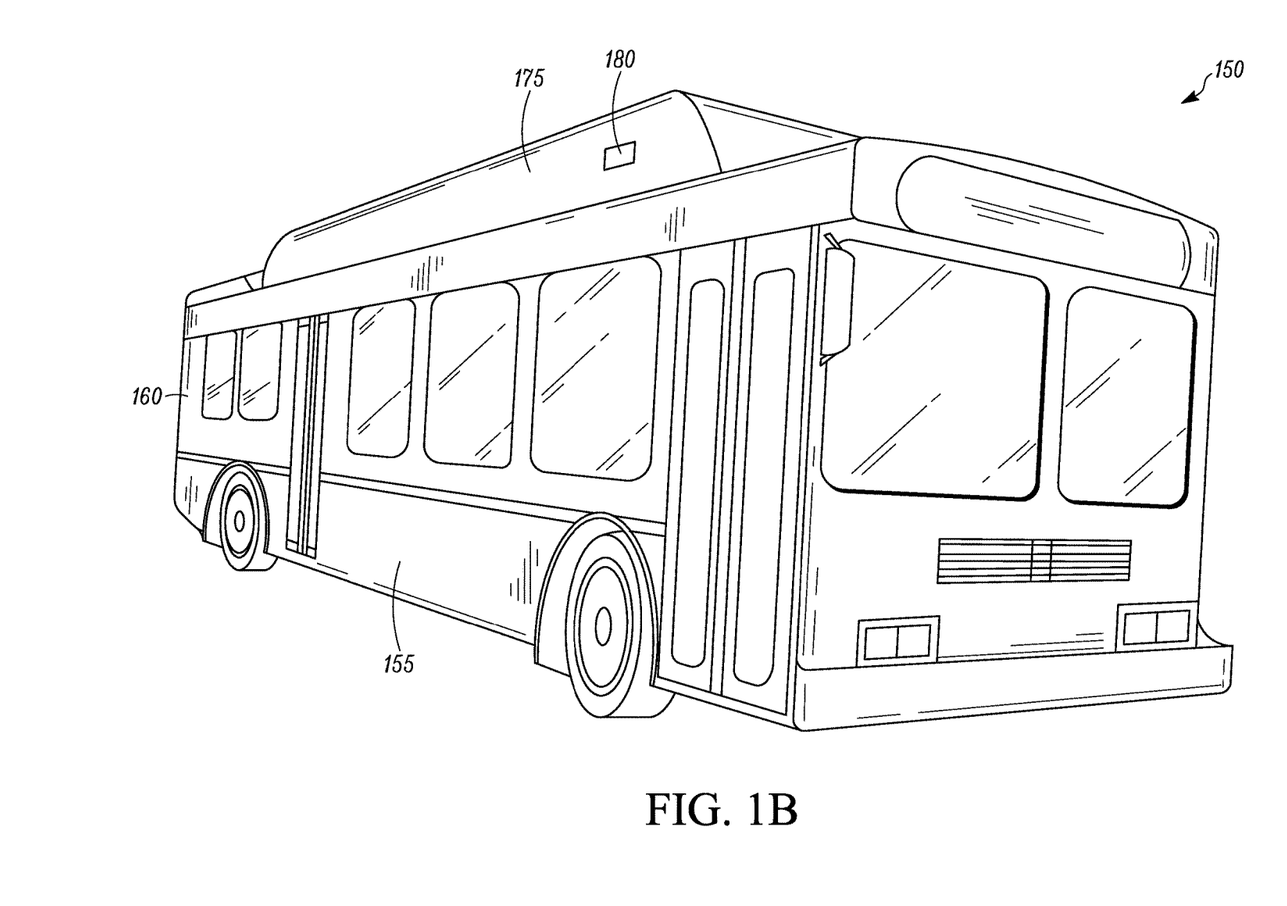
FIG. 1B illustrates a perspective view of a transport vehicle including a HVAC system with a refrigeration circuit, according to one embodiment.

FIG. 1B is a perspective view of a vehicle 150. In the embodiment illustrated in FIG. 1B, the vehicle 150 is a mass-transit bus that carries passengers (not shown) to one or more destinations. In other embodiments, the vehicle 150 can be a school bus or other commercial vehicle that carries passengers. Hereinafter, the term "vehicle" shall be used to represent all such passenger vehicles, and shall not be construed to limit the scope of the invention solely to mass-transit buses. The vehicle 150 includes a frame 155 enclosing a compartment 160. The vehicle 150 also includes a HVAC system 175 that includes a refrigeration circuit (not shown) configured to provide HVAC within the compartment 160. The HVAC system 175 also includes a controller 180 that is configured to communicate with, manage, command, direct and regulate the behavior of one or more refrigeration components of the refrigeration circuit (e.g., one or more valves, an evaporator, a condenser, a compressor, an expansion valve (EXV) etc.), a generator, etc.

Figure 2:
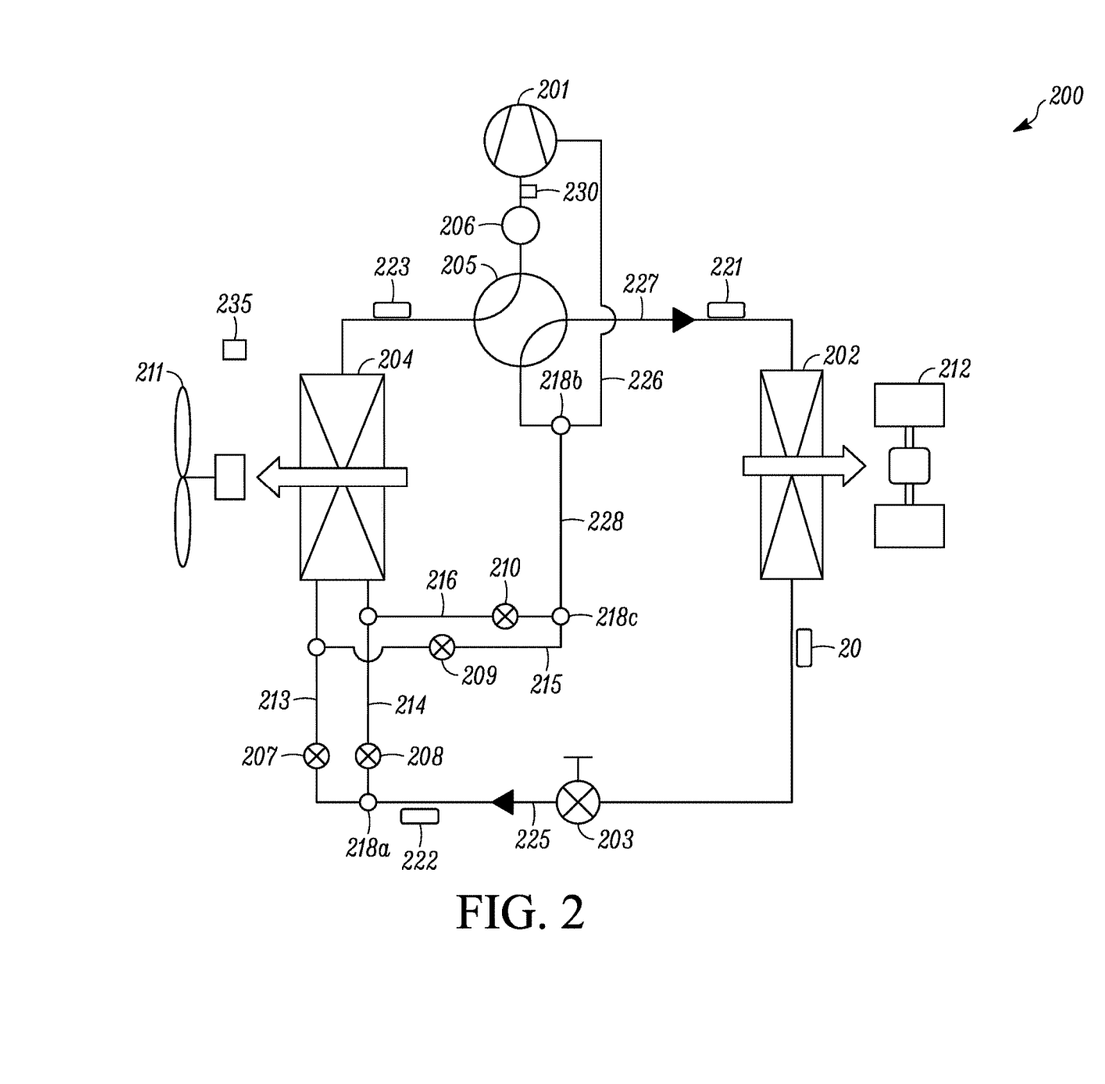
FIG. 2 illustrates a refrigeration circuit, according to one embodiment.

FIG. 2 illustrates a refrigeration circuit 200 for a refrigerated container (e.g., the container 100 shown in FIG. 1A) or a HVAC system of a vehicle (e.g., the vehicle 100 shown in FIG. 1B), according to one embodiment. The refrigeration circuit 200 can operate in a cooling configuration and a heat pump configuration. In the cooling configuration, the refrigeration circuit 200 can operate in a cooling mode to provide cool air within a conditioned space (e.g., the conditioned space 110 shown in FIG. 1A or the compartment 160 shown in FIG. 1B). In the heat pump configuration, the refrigeration circuit 200 can operate in a heating mode to provide heated air within the conditioned space and can operate in a defrost mode to defrost an outdoor heat exchanger 204.

In a heat pump configuration, a high temperature and high pressure gas refrigerant is discharged from a compressor 201 and is passed through a four-way switching valve 205. The high temperature and high pressure gas refrigerant is cooled by the circulating air in the conditioned space via an indoor heat exchanger 202 (e.g., condenser) (by which the circulating air is heated), and turns into high pressure liquid refrigerant. The high pressure liquid refrigerant is decompressed by an expansion valve 203 (e.g., a motor-operated expansion valve, a mechanically-operated expansion valve, etc.), draws heat from the outside ambient air via the outdoor heat exchanger 204 (e.g., evaporator) and turns into low pressure gas refrigerant. The low pressure gas refrigerant is returned via the four-way switching valve 205 and an accumulator 206 to the compressor 201. While FIG. 2 illustrates a four-way switching valve 205, it will be appreciated that in other embodiments the four-way switching valve 205 can be replaced with other valve configurations to provide the same functionality as the four-way switching valve 205.

The outdoor heat exchanger 204 is equipped with an outdoor fan 211 so as to send outside ambient air through the outdoor heat exchanger 204 for heat exchange. The indoor heat exchanger 202 is equipped with an indoor fan 212 so as to send the air in the conditioned space through the indoor heat exchanger 202 for heat exchange. An inlet pipe 225 communicating the expansion valve 203 and the outdoor heat exchanger 204 is split via a branch pipe 218a into two split lines of inlet pipes 213 and 214, and the split flow of inlet pipes 213 and 214 are provided with first solenoid valves 207 and 208, respectively, for opening and closing the refrigerant flow paths of the main circuit. Further, a branch pipe 218b disposed on a pipe 226 communicating the compressor 201 and the indoor heat exchanger 202 at the outlet-side of the compressor 201 splits the flow into a pipe 227 leading to the indoor heating exchanger 202 and a pipe 228 connected to bypass pipes 215 and 216 via branch pipe 218c that are connected respectively to inlet pipes 213 and 214 of the outdoor heat exchanger 204. The bypass pipes 215 and 216 are equipped with second solenoid valves 209 and 210 for respectively opening and closing the refrigerant flow paths of bypass pipes 215 and 216.

Further, temperature sensors 220 and 221 (for the cooling mode) are attached to an inlet and an outlet of the indoor heat exchanger 202, and temperature sensors 222 and 223 (for the heating mode) are attached to an inlet and an outlet of the outdoor heat exchanger 204. The temperature difference of the refrigerant can be detected via the temperature sensors 220 and 221 or the temperature sensors 222 and 223. By controlling valve operation of the expansion valve 203, the refrigerant flow rate can be controlled so as to maintain a constant refrigerant temperature deviation.

Also, the refrigeration circuit 200 includes a compressor suction pressure sensor 230 connected to a suction line that returns refrigerant back to the compressor 201 and an ambient air temperature sensor 235. The compressor suction pressure sensor 230 can be configured to continuously monitor a compressor suction pressure and send the monitored compressor suction pressure data to a controller (e.g., the controller 20 shown in FIG. 1A or the controller 180 shown in FIG. 1B). Similarly, the ambient air temperature sensor 235 can be configured to continuously monitor an outside ambient temperature and send the monitored ambient air temperature data to the controller.

Also, the temperature sensor 223 is configured to continuously monitor a temperature at an outlet of the heat exchanger 204 and send the monitored temperature data to the controller.

A controller can determine initiation and termination of the defrost mode of the refrigeration circuit 200 based on compressor suction pressure data obtained from the compressor suction pressure sensor 230 and based on ambient air temperature data obtained from the ambient air temperature sensor 235. In some embodiments, the compressor suction pressure sensor 230 can be replaced with a compressor suction temperature sensor and the controller can be configured to determine initiation and termination of the defrost mode of the refrigeration circuit 200 based on compressor suction temperature data obtained from the compressor suction temperature sensor and based on ambient air temperature data Obtained from the ambient air temperature sensor 235.

Figure 3:
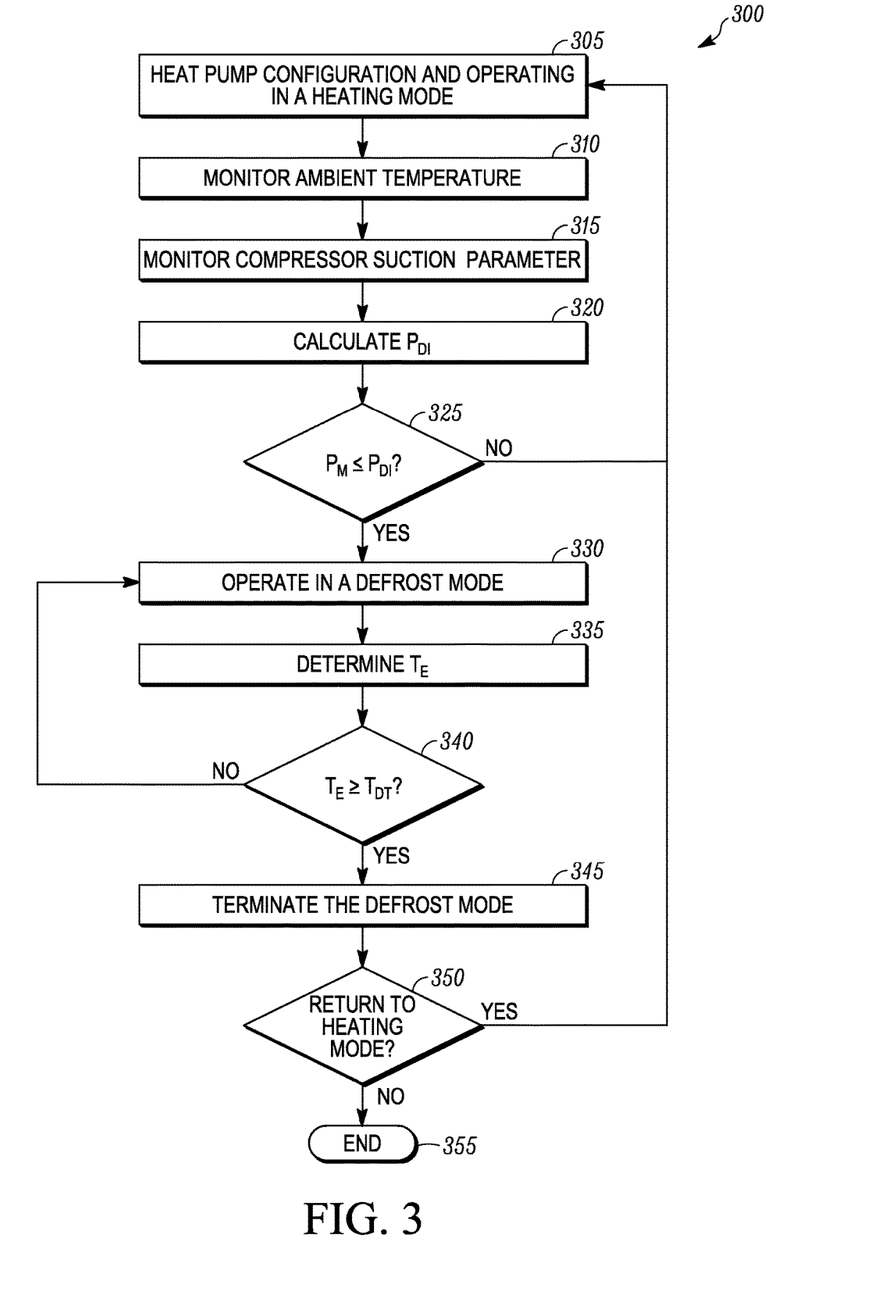
FIG. 3 illustrates a flowchart of a method for defrosting a heat exchanger of a refrigeration circuit when operating in a heat pump configuration, according to one embodiment.

FIG. 3 illustrates a flowchart of a method 300 for defrosting a heat exchanger of a refrigeration circuit (e.g., the refrigeration circuit 200 shown in FIG. 2) when operating in a heat pump configuration, according to one embodiment.

The method starts at 305, whereby a controller (e.g., the controller 20 shown in FIG. 1) instructs the refrigeration circuit to operate in a heat pump configuration (e.g., a heating operation) and start a heating mode to provide heat within a contained space. When the refrigeration circuit is operating in the heat pump configuration and is in a heating mode, the method 300 proceeds to 310.

At 310, the controller monitors an ambient temperature outside of the conditioned space (e.g., via the ambient air temperature sensor 235 shown in FIG. 2). At 315, the controller monitors a compressor suction parameter $P_M$ (e.g., via the compressor suction pressure sensor 230 shown in FIG. 2). In some embodiments, the compressor suction parameter $P_M$ is a compressor suction pressure. In other embodiments, the compressor suction parameter $P_M$ can be a compressor suction temperature.

Also, in some embodiments, the controller monitors the ambient temperature and/or the compressor suction parameter $P_M$ continuously when the refrigeration circuit is operating in a heating mode.

At 320, the controller calculates a compressor suction parameter threshold $P_{DI}$ for defrost initiation based on the ambient temperature determined at 310. At 325, the controller determines whether the monitored compressor suction parameter $P_M$ is less than or equal to the calculated compressor suction parameter threshold $P_{DI}$ for defrost initiation.

Figure 4:
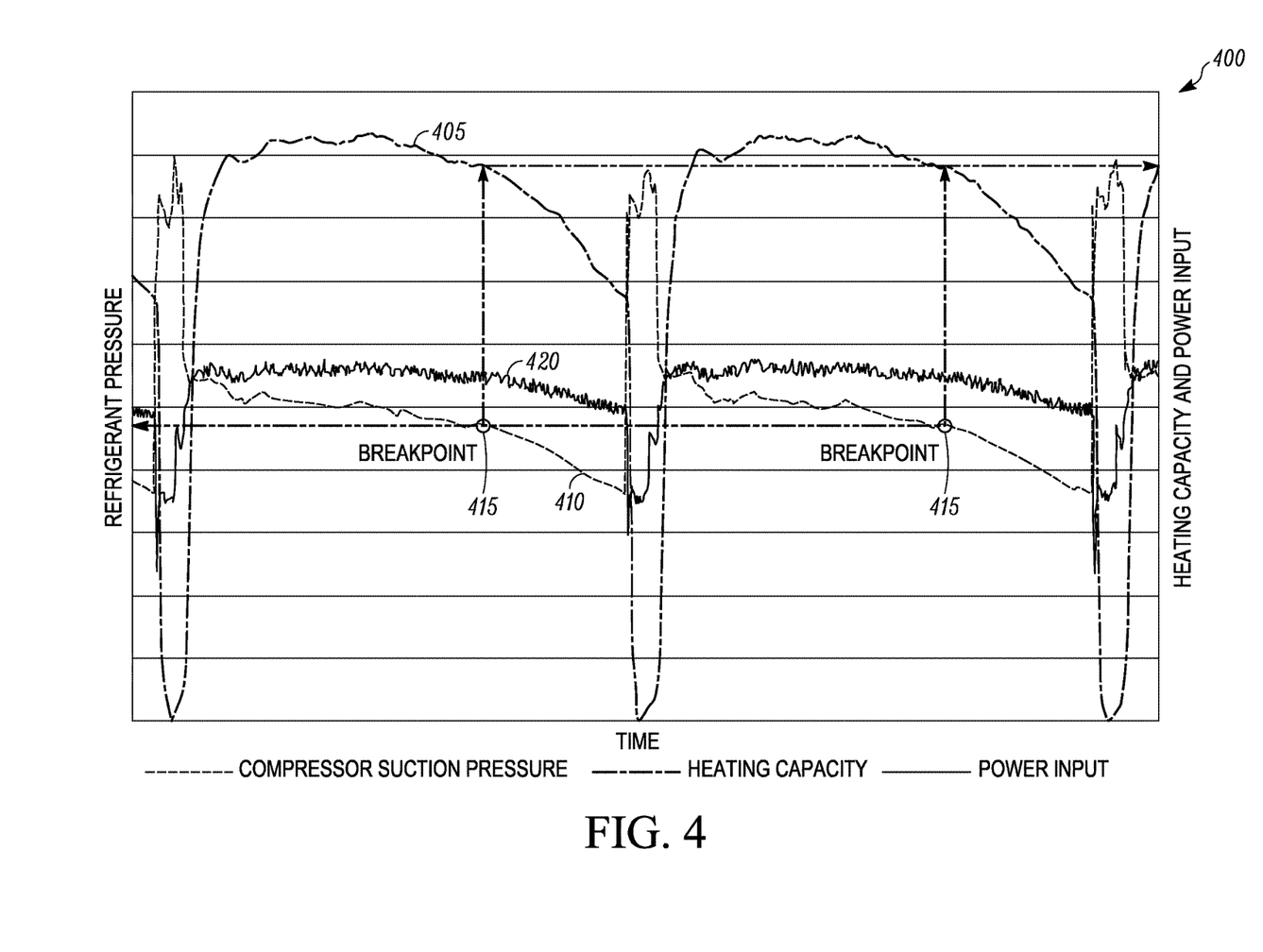
FIG. 4 illustrates a chart depicting a refrigerant compressor suction pressure, a heating capacity of a refrigeration circuit and a power input over time, according to one embodiment.

To determine the compressor suction parameter threshold $P_{DI}$, Applicant has found that a refrigerant compressor suction parameter (e.g., a refrigerant compressor suction pressure and a refrigerant compressor suction temperature) at a compressor suction line together with a heating capacity of the refrigeration circuit rapidly decrease when a specific amount of frost is accumulated on a heat exchanger (e.g., the fins of a evaporator). For example, as shown in FIG. 4, the chart 400 illustrates that the heating capacity (shown as line 405) and the compressor suction pressure (shown as line 410) begin to exponentially decrease at the same (shown at breakpoints 415). Also, the power input (shown as line 420) also decreases at the same time. Thus, a breakpoint when refrigerant compressor suction parameter starts to fall can be used determine when to initiate a defrost mode.

Figure 5:
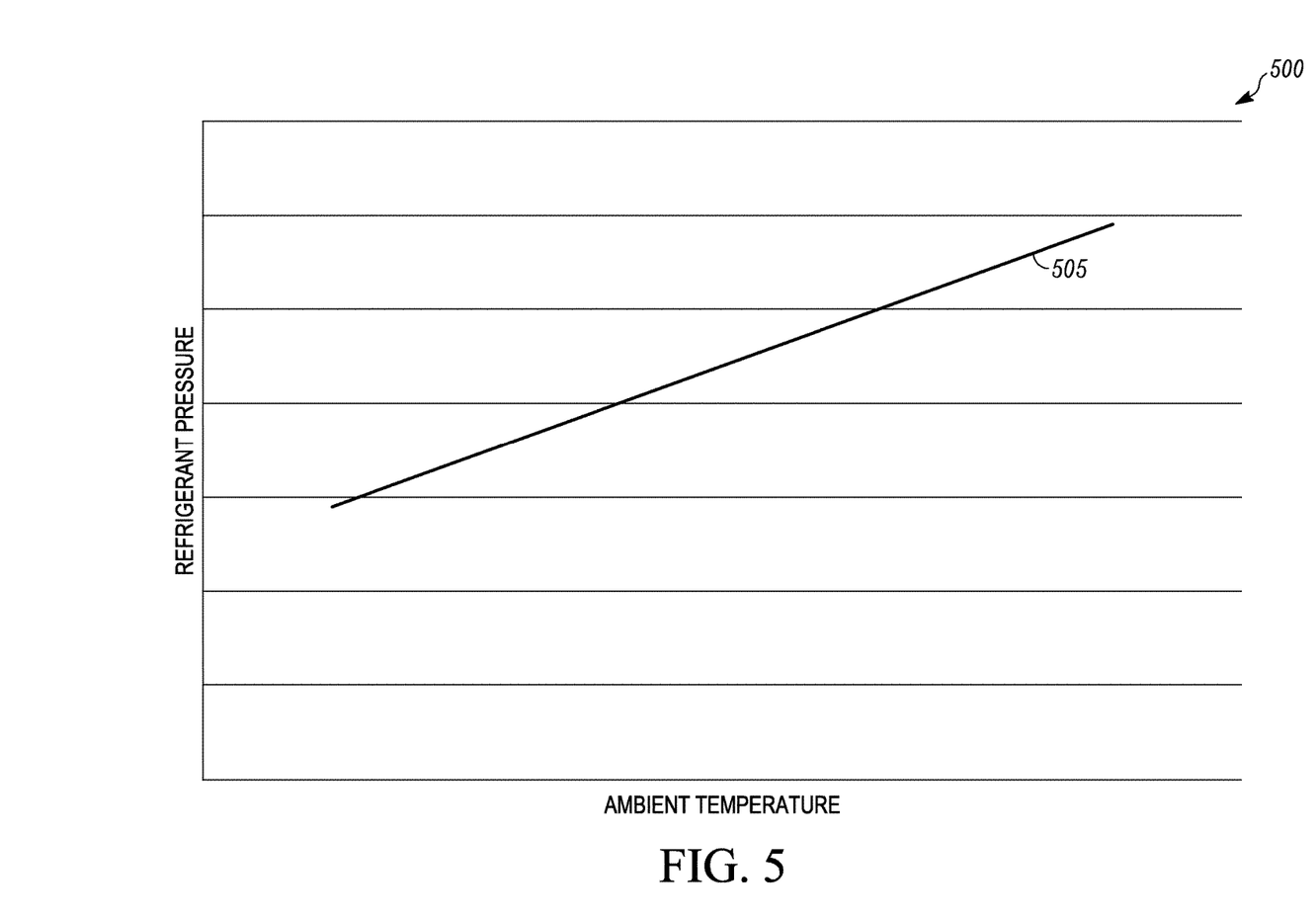
FIG. 5 illustrates a chart depicting a refrigerant compressor suction pressure versus an ambient temperature outside of a conditioned space, according to one embodiment.

Also, Applicant has found that the breakpoint changes linearly based on an ambient temperature outside of the conditioned space. For example, as shown in FIG. 5, the chart 500 illustrates that a refrigerant compressor suction pressure varies linearly based on an ambient temperature outside of the conditioned space (as shown by line 505). Thus, an accurate compressor suction parameter threshold (e.g., the breakpoint 410 shown in FIG. 4) can be calculated based on the ambient temperature outside of the conditioned space.

Accordingly, in some embodiments, the compressor suction parameter threshold $P_{DI}$ for a particular ambient temperature can be determined by the controller using, for example, a lookup table of previous test results indicating the compressor suction parameter threshold $P_{DI}$ for each ambient temperature based on the particular refrigeration circuit being used.

If the controller determines that the measured compressor suction parameter $P_M$ is less than or equal to the calculated compressor suction parameter threshold $P_{DI}$ for defrost initiation, the method 300 proceeds to 330. If the controller determines that the measured compressor suction parameter $P_M$ is greater than the calculated compressor suction parameter threshold $P_{DI}$ for defrost initiation, the method 300 proceeds back to 305.

At 330, the controller instructs the refrigeration circuit to operate in a defrost mode. At 335, the controller determines a refrigerant temperature $T_E$ at an outlet of an evaporator (e.g., using the temperature sensor 223 shown in FIG. 2) of the refrigeration circuit. At 340, the controller determines whether the measured refrigerant temperature $T_E$ at the outlet of the evaporator of the refrigeration circuit is greater than or equal to a temperature threshold $T_{DT}$ for defrost termination. The temperature threshold $T_{DT}$ for defrost termination can be set by the controller at a temperature where it is known that the evaporator no longer is clogged by frost.

If the controller determines that the measured refrigerant temperature $T_E$ at the outlet of the evaporator of the refrigeration circuit is greater than or equal to the temperature threshold $T_{DT}$ for defrost termination, the method 300 proceeds to 345. If the controller determines that the measured refrigerant temperature $T_E$ at the outlet of the evaporator of the refrigeration circuit is less than the temperature threshold $T_{DT}$ for defrost termination, the method 300 proceeds to 350.

At 350, the controller determines whether the refrigerant circuit should run in the heating mode. If the controller determines that the refrigerant circuit should run in the heating mode, the method 300 proceeds back to 305. If the controller determines that the refrigerant circuit is not required to run in the heating mode, the method 300 proceeds to 355, whereby the method 300 ends.

Aspects

It is noted that any of aspects 1-21 below can be combined.

Aspect 1. A method for defrosting a heat exchanger of a refrigeration circuit, the method comprising:

monitoring a compressor suction parameter at a suction line to a compressor of the refrigeration circuit;

determining a compressor suction parameter threshold; and initiating a defrost mode of the refrigeration circuit when the compressor suction parameter is less than or equal to the compressor suction parameter threshold.

Aspect 2. The method of aspect 1, further comprising:
monitoring an ambient temperature outside of a conditioned space; and
determining the compressor suction parameter threshold based on the ambient temperature.

Aspect 3. The method of any of aspects 1-2, wherein the compressor suction parameter is a compressor suction pressure.

Aspect 4. The method of any of aspects 1-2, wherein the compressor suction parameter is a compressor suction temperature.

Aspect 5. The method of any of aspects 1-4, further comprising:
monitoring a temperature at an outlet of an outside heat exchanger of the refrigeration circuit;
terminating the defrost mode when the temperature at the outlet of the outside heat exchanger is equal to or greater than a temperature threshold.

Aspect 6. A system for providing heating to a conditioned space, the system comprising:
a refrigeration circuit that includes a compressor and an outside heat exchanger;
a compressor suction parameter sensor configured to monitor a compressor suction parameter at a suction line to the compressor; and
a controller configured to receive compressor suction parameter data from the compressor suction parameter sensor, and configured to initiate a defrost mode when the compressor suction parameter is less than or equal to the compressor suction parameter threshold.

Aspect 7. The system of aspect 6, further comprising an ambient temperature sensor configured to monitor an ambient temperature outside of the conditioned space;
wherein the controller is configured to receive ambient temperature data from the ambient temperature sensor and configured to determine the compressor suction parameter threshold based on the ambient temperature data.

Aspect 8. The system of any of aspects 6-7, wherein the compressor suction parameter is a compressor suction pressure.

Aspect 9. The system of any of aspects 6-7, wherein the compressor suction parameter is a compressor suction temperature.

Aspect 10. The system of any of aspects 6-9, further comprising:
a temperature sensor configured to monitoring a temperature at an outlet of the outside heat exchanger;
wherein the controller is configured to terminate the defrost mode when the temperature at the outlet of the outside heat exchanger is equal to or greater than a temperature threshold.

Aspect 11. A vehicle comprising:
a frame enclosing a conditioned space; and
a heating, ventilation and air conditioning (HVAC) unit coupled to the frame and configured to heat the conditioned space, the HVAC unit including:
a refrigeration circuit that includes a compressor and an outside heat exchanger,
a compressor suction parameter sensor configured to monitor a compressor suction parameter at a suction line to the compressor, and
a controller configured to receive compressor suction parameter data from the compressor suction parameter sensor, and configured to initiate a defrost mode when the compressor suction parameter is less than or equal to the compressor suction parameter threshold.

Aspect 12. The vehicle of aspect 11, wherein the HVAC unit includes an ambient temperature sensor configured to monitor an ambient temperature outside of the conditioned space; and
wherein the controller is configured to receive ambient temperature data from the ambient temperature sensor and configured to determine the compressor suction parameter threshold based on the ambient temperature data.

Aspect 13. The vehicle unit of any of aspects 11-12, wherein the compressor suction parameter is a compressor suction pressure.

Aspect 14. The vehicle of any of aspects 11-12, wherein the compressor suction parameter is a compressor suction temperature.

Aspect 15. The vehicle of any of aspects 11-14, wherein the HVAC unit includes a temperature sensor configured to monitoring a temperature at an outlet of the outside heat exchanger; and
wherein the controller is configured to terminate the defrost mode when the temperature at the outlet of the outside heat exchanger is equal to or greater than a temperature threshold.

Aspect 16. A refrigerated transport unit comprising:
a container including a conditioned space; and
a transport refrigeration unit coupled to an end of the container and configured to heat the conditioned space, the transport refrigeration unit including:
a refrigeration circuit that includes a compressor and an outside heat exchanger,
a compressor suction parameter sensor configured to monitor a compressor suction parameter at a suction line to the compressor, and
a controller configured to receive compressor suction parameter data from the compressor suction parameter sensor, and configured to initiate a defrost mode when the compressor suction parameter is less than or equal to the compressor suction parameter threshold.

Aspect 17. The refrigerated transport unit of aspect 16, wherein the transport refrigeration unit includes an ambient temperature sensor configured to monitor an ambient temperature outside of the conditioned space; and
wherein the controller is configured to receive ambient temperature data from the ambient temperature sensor and configured to determine the compressor suction parameter threshold based on the ambient temperature data.

Aspect 18. The refrigerated transport unit of any of aspects 16-17, wherein the compressor suction parameter is a compressor suction pressure.

Aspect 19. The refrigerated transport unit of any of aspects 16-17, wherein the compressor suction parameter is a compressor suction temperature.

Aspect 20. The refrigerated transport unit of any of aspects 16-19, wherein the transport refrigeration unit includes a temperature sensor configured to monitoring a temperature at an outlet of the outside heat exchanger; and
wherein the controller is configured to terminate the defrost mode when the temperature at the outlet of the outside heat exchanger is equal to or greater than a temperature threshold.

Aspect 21. The refrigerated transport unit of any of aspects 16-20, wherein the container is a railway container.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. The word "embodiment" as used within this Specification may, but does not necessarily, refer to the same embodiment. This Specification and the embodiments described are exemplary only. Other and further embodiments may be devised without departing from the basic scope thereof, with the true scope and spirit of the disclosure being indicated by the claims that follow.

The invention claimed is:

1. A method for defrosting a heat exchanger of a refrigeration circuit, the method comprising:
    monitoring a compressor suction parameter at a suction line to a compressor of the refrigeration circuit;
    monitoring an ambient temperature of ambient air outside of a conditioned space;
    determining a compressor suction parameter threshold based on the ambient temperature, wherein the compressor suction parameter threshold is a variable threshold value; and
    initiating a defrost mode of the refrigeration circuit when the compressor suction parameter monitored at the suction line of the compressor is less than or equal to the compressor suction parameter threshold that is a variable threshold value determined based on the ambient temperature.

2. The method of claim 1, wherein the compressor suction parameter is a compressor suction pressure.

3. The method of claim 1, wherein the compressor suction parameter is a compressor suction temperature.

4. The method of claim 1, further comprising:
    monitoring a temperature at an outlet of the heat exchanger of the refrigeration circuit;
    terminating the defrost mode when the temperature at the outlet of the heat exchanger is equal to or greater than a temperature threshold.

5. A system for conditioning air within a conditioned space, the system comprising:
    a refrigeration circuit that includes a compressor and an outside heat exchanger;
    an ambient temperature sensor configured to monitor an ambient temperature of ambient air outside of the conditioned space;
    a compressor suction parameter sensor configured to monitor a compressor suction parameter at a suction line to the compressor; and
    a controller configured to receive compressor suction parameter data from the compressor suction parameter sensor, configured to receive ambient temperature data from the ambient temperature sensor, configured to determine a compressor suction parameter threshold based on the ambient temperature data, wherein the compressor suction parameter threshold is a variable threshold value, and configured to initiate a defrost mode when the compressor suction parameter monitored at the suction line of the compressor is less than or equal to the compressor suction parameter threshold that is a variable threshold value determined based on the ambient temperature.

6. The system of claim 5, wherein the compressor suction parameter is a compressor suction pressure.

7. The system of claim 5, wherein the compressor suction parameter is a compressor suction temperature.

8. The system of claim 5, further comprising:
    a temperature sensor configured to monitor a temperature at an outlet of the outside heat exchanger;
    wherein the controller is configured to terminate the defrost mode when the temperature at the outlet of the outside heat exchanger is equal to or greater than a temperature threshold.

9. A vehicle comprising:
    a frame enclosing a conditioned space; and
    a heating, ventilation and air conditioning (HVAC) unit coupled to the frame and configured to condition air within the conditioned space, the HVAC unit including:
        a refrigeration circuit that includes a compressor and an outside heat exchanger,
        an ambient temperature sensor configured to monitor an ambient temperature of ambient air outside of the conditioned space,
        a compressor suction parameter sensor configured to monitor a compressor suction parameter at a suction line to the compressor, and
        a controller configured to receive compressor suction parameter data from the compressor suction parameter sensor, configured to receive ambient temperature data from the ambient temperature sensor, configured to determine a compressor suction parameter threshold based on the ambient temperature data, wherein the compressor suction parameter threshold is a variable threshold value, and configured to initiate a defrost mode when the compressor suction parameter monitored at the suction line of the compressor is less than or equal to the compressor suction parameter threshold that is a variable threshold value determined based on the ambient temperature.

10. The vehicle unit of claim 9, wherein the compressor suction parameter is a compressor suction pressure.

11. The vehicle of claim 9, wherein the compressor suction parameter is a compressor suction temperature.

12. The vehicle of claim 9, wherein the HVAC unit includes a temperature sensor configured to monitor a temperature at an outlet of the outside heat exchanger; and
    wherein the controller is configured to terminate the defrost mode when the temperature at the outlet of the outside heat exchanger is equal to or greater than a temperature threshold.

13. The method of claim 1, wherein determining the compressor suction parameter threshold based on the ambient temperature includes using a lookup table of previous test results indicating the compressor suction parameter threshold of the refrigeration circuit at different ambient temperatures.

14. The system of claim 5, wherein the controller is configured to configured to determine the compressor suction parameter threshold based on the ambient temperature data by using a lookup table of previous test results indicating the compressor suction parameter threshold of the refrigeration circuit at different ambient temperatures.

15. The vehicle of claim 9, wherein the controller is configured to configured to determine the compressor suction parameter threshold based on the ambient temperature data by using a lookup table of previous test results indicating the compressor suction parameter threshold of the refrigeration circuit at different ambient temperatures.

16. The method of claim 1, wherein the refrigeration circuit provides heat exchange between the ambient air and air in the conditioned space.

* * * * *